United States Patent

[11] 3,563,296

| [72] | Inventor | Thomas A. Wells |
| | | 504 Glendalyn Ave., Spartanburg, S.C. 29302 |
| [21] | Appl. No. | 776,333 |
| [22] | Filed | Nov. 18, 1968 |
| [45] | Patented | Feb. 16, 1971 |

[54] FOLDED ENDLESS REINFORCEMENT FOR PNEUMATIC TIRES
11 Claims, 6 Drawing Figs.

| [52] | U.S. Cl. | 152/361 |
| [51] | Int. Cl. | B60c 9/14 |
| [50] | Field of Search | 152/361 |

[56] References Cited
UNITED STATES PATENTS

| 2,895,525 | 7/1959 | Lugli | 152/361 |
| 3,024,829 | 3/1962 | Cooper | 152/361 |

*Primary Examiner* — James B. Marbert
*Attorneys* — Norman C. Armitage and H. William Petry

ABSTRACT: An endless reinforcement for a pneumatic tire which comprises continuous cord in an endless folded strip, the cord being disposed across the width thereof from one side to the other in a generally zigzag pattern at an angle to the edges with reversals at the edges. Also, the method of producing such a reinforcement.

PATENTED FEB 16 1971
3,563,296
SHEET 1 OF 3
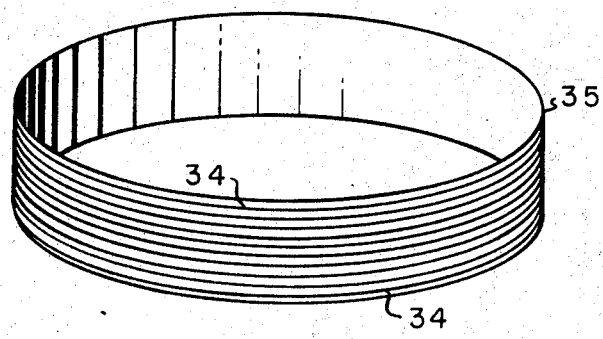
FIG. -2-
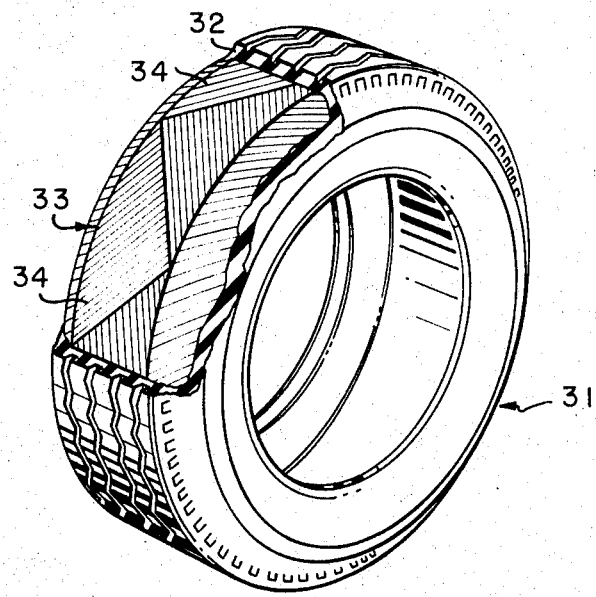
FIG. -1-
INVENTOR.
THOMAS A. WELLS
BY Arthur L. Urban
ATTORNEY PATENTED FEB 16 1971
3,563,296
SHEET 2 OF 3
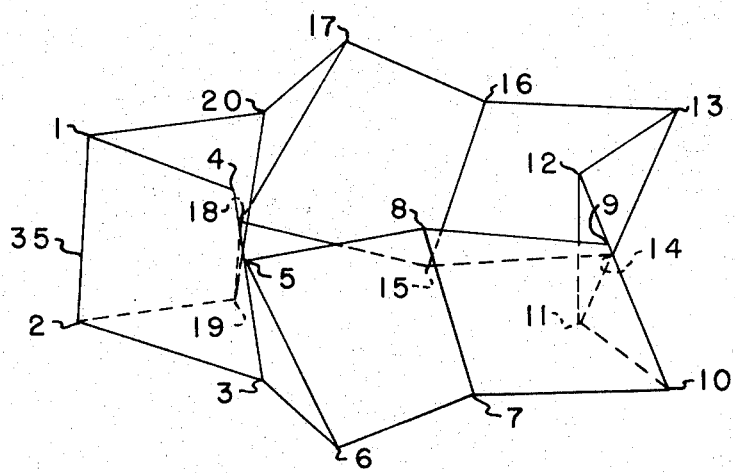
FIG. -3-
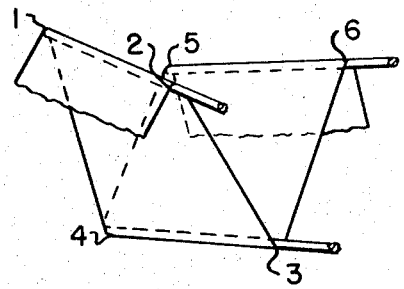
FIG. -4-
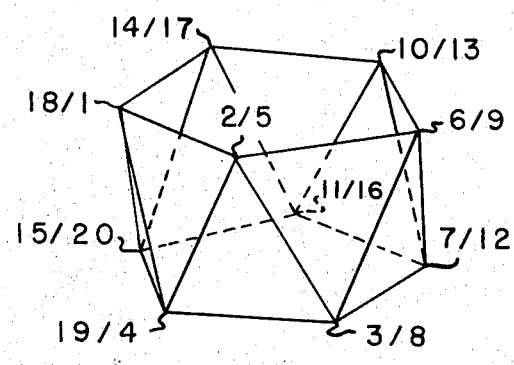
FIG. -5-
INVENTOR.
THOMAS A. WELLS
BY
ATTORNEY

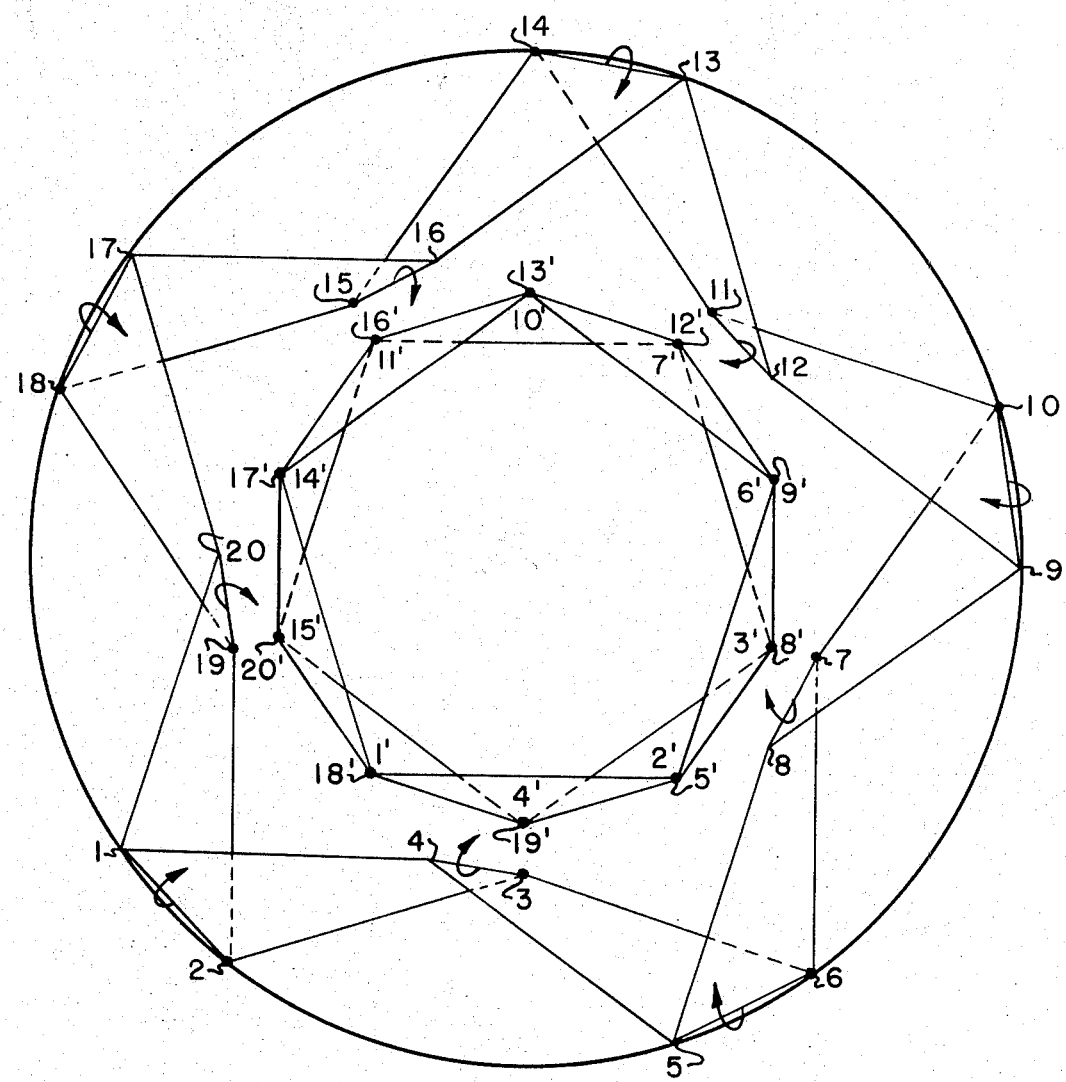
FIG.-6-

FOLDED ENDLESS REINFORCEMENT FOR PNEUMATIC TIRES

The tire industry in the U.S. recently has developed considerable interest in so-called belted tires. While tread reinforcing belts or breaker strips have been utilized for a considerable period of time with radial tires, such tires have not gained general acceptance in the U.S. because of the harsh riding qualities which are encountered with U.S. automobiles using such tires. More recently, with the emphasis on automotive safety, there has been increased interest in developing belted tires suitable for U.S. cars. Belted tires which have been produced commercially in the U.S. to date utilize strips of bias cut woven fabric which are wrapped around the tire carcass and spliced together or overlapped prior to the application of the sidewall and tread-forming rubber stock to the carcass. Such breaker strips generally have been made from fiberglass or rayon cords or metal wires. With such strips, a serious problem is encountered because of the great number of cut ends at each edge of the strip. Another problem is the inherent imbalance of such tires due to the overlap or splicing of the strips.

Various types of belts have been proposed in the patent literature, for example, Vanzo Pat. No. 2,982,327. While the patent discloses the formation of an endless belt with a zigzag pattern, the patent is concerned primarily with forming breaker strips having cut ends wherein a strip is wound about a tire carcass and overlapped or spliced. As shown and described in that patent, a strip of fabric composed of threads or cords parallel to its long axis is folded alternately in a zigzag overlapping pattern to form a structure consisting of a series of parallelograms superimposed upon one another. A disadvantage of the Vanzo folded strip is the nonuniformity caused by the discontinuous nature of the strip when it is applied to a tire carcass. The overlaps or splices, as pointed out above, are undesirable because of the inherent nonuniformity and imbalance which they create in the final tire.

An advantage of the tire reinforcement of the invention is that it is endless and free from splices. Also, the invention provides a simple and convenient method for producing a folded endless tire reinforcement with a high degree of uniformity.

The present invention provides an endless reinforcement for a pneumatic tire which comprises continuous cord in an endless folded strip disposed across the width of the folded reinforcement from one side to the other in a generally zigzag pattern at an angle to the edges with reversals at the edges.

The folded endless reinforcement or belt of the invention usually is of a generally cylindrical configuration and is made from conventional tire cord materials such as fiberglass, rayon, polyester, nylon, cotton, metal wire and similar type cords. The dimensions of the belt may be varied over a considerable range depending upon the ultimate use thereof. For example, with a belt which is to be applied to a tire carcass in flat band form, the circumference of the belt will be considerably smaller than the final circumference in the finished tire. Likewise, the original width of the belt applied to the carcass will be substantially larger than the final width. This is due to the fact that during the expansion step in the forming of the tire the circumference of the belt usually will be substantially increased and the width will be significantly reduced. During this expansion, the angle of the cord across the width of the belt from one side to the other as measured from the edge usually will be reduced to a substantial degree. With a belt which is to be applied to a carcass that already has been formed into the shape of a torus, i.e., a doughnut shape similar to that of the final tire, the dimensions of the belt will be substantially the same in its original form as applied to the carcass and in its final size in the finished tire.

The reinforcement preferably is formed from a minimum number of continuous cords so that the number of cut ends will be negligible. Advantageously, the complete reinforcement is formed from a single continuous cord which initially is wound circumferentially and substantially parallel to adjacent cords to form an endless strip. In this case, the two ends of the single cord are the only cut ends in the strip. Under some conditions, it may be desirable to form the reinforcement from several cords simultaneously with each of the cords being wound circumferentially and being positioned similarly to the single cord but displaced therefrom. This may facilitate the production of a breaker in a short period of time. In either situation, it is apparent that the reinforcement of the invention is endless thus eliminating splices or overlapping which creates nonuniformity and can lead to imbalance and possible premature failure of a tire.

In the folded endless reinforcement of the invention, the cord is positioned across the width of the belt from one side to the other at an angle to the edges in a generally zigzag pattern. In a belt intended to be expanded, the angle of the cord before expansion generally is in the range of about 50° to 80° and preferably about 50° to 70° measured from an edge. During expansion of such a belt, the angle of the cord generally will be reduced to an angle in the range of about 5° to 35°. With a reinforcement which is applied to a carcass after the carcass has been expanded, the angle of the cord generally is less than about 35°, that is, about the same angle as the final cord angle of the expanded belt.

As pointed out above, in the folded reinforcement belt of the invention, there is a reversal of the cord at the edges. Upon reversal of the endless strip during folding, the succeeding portion of the strip is positioned in a zigzag pattern at approximately the same angle with respect to one edge of the belt as the previous portion thereof prior to the reversal is with respect to the opposite edge. This provides a symmetrical cord position in the final belt and minimizes the possibility of nonuniformity and/or imbalance in the tire.

It is advantageous that cord employed be covered with rubber, either vulcanized, partially vulcanized or unvulcanized. This covering is particularly important when the cord is a material which is easily abraded or degraded by rubbing contact, for example, fiberglass. Preferably, a coating of rubber is extruded around the cord immediately prior to the formation of the initial endless strip. Also, the cord may be associated with a rubber layer. For example, a rubber layer may be placed on the inside surface of the reinforcement with or without a second rubber layer on the outside thereof. In addition, it may be desirable to provide rubber shoulder portions adjacent the edges of the folded belt. Such shoulder portions can be used with the cord belt alone or in combination with one or more rubber layers. The shoulder portions may assist in the positioning of the reinforcement with respect to the carcass so that the edges will be properly disposed in the final tire in relation to the center portion of the belt. Such shoulder portions are particularly useful in the production of tires in which it is desirable that the reinforcement be disposed equidistant from the tread surface at all points across the width thereof.

While the above description has been directed primarily to a folded endless reinforcement breaker for pneumatic tires, it will be apparent that the reinforcement of the invention also may be utilized in other cord components of a tire, for example, the carcass itself. Also, the reinforcement can be applied to a carcass in flat band form and expanded, e.g., to produce a belted bias ply tire or applied to an expanded carcass such as in the production of a radial ply tire. Furthermore, the folded reinforcement can be applied to a used tire from which the tread has been removed, new tread stock applied and vulcanized to form a belted retread tire.

The invention will be illustrated further with reference to the accompanying drawings in which:

FIG. 1 is a perspective view of a tire partially in section showing a folded reinforcement of the invention, FIG. 2 is a perspective view of continuous cord in an endless strip prior to folding into a reinforcement of the invention, FIG. 3 is a perspective view of the endless strip of FIG. 2 (cords omitted) showing the location of the fold lines prior to folding, FIG. 4 is a fragmentary view of the endless strip of FIG. 3 during the folding operation, FIG. 5 is a perspective view of a folded reinforcement of the invention, and FIG. 6 is a schematic illustration showing the positions of points on the periphery of the endless strip–initially, after location of the fold lines and in a folded configuration.

In FIG. 1, a tire 31 has a tread position 32 and a folded endless reinforcement 33 disposed below the tread portion. The reinforcement 33 is composed of continuous cord 34 which initially is disposed circumferentially in the form of an endless strip 35 as shown in FIG. 2. The reinforcement is formed by folding the endless strip 35 so the cord is across the width of the reinforcement from one side to the other in a generally zigzag pattern at an angle to the edges with reversals at the edges.

The cord 34 advantageously is wound on a cylindrical surface (not shown) with each succeeding revolution being disposed adjacent to the cord previously positioned. Prior to the actual folding of the initial endless strip 35, fold lines are established. As shown in FIG. 3, the strip 35 is disposed in a geometric shape with 10 fold lines, five of which are external fold lines, namely, lines 1-2, 5-6, 9-10, 13-14 and 17-18. The geometric shape also includes five internal fold lines 3-4, 7-8, 11-12, 15-16 and 19-20.

In the folding of the strip 35 to form the generally zigzag pattern of the final belt, one end of each of the fold lines moves from one edge of the strip to the other in an alternate pattern. Thus, as illustrated in FIG. 5, point 2 of line 1-2 moves from the lower edge of the strip to the upper edge thereof. In the same way, point 4 of line 3-4 moves from the upper edge of the strip to the lower edge of the strip to a position adjacent to point 19. Likewise, points 6, 10, 14 and 18 move from the lower edge of the strip to the upper edge, and points 8, 12, 16 and 20 move from the upper edge to the lower edge thereof. Thus, a folded reinforcement belt is formed having a plurality of triangular portions, as shown in FIG. 5, one example of which is a triangle formed by points 3', 5' and 6'. As a result, each parallelogram portion of the reinforcement, e.g., 1-2-3-4, is folded with respect to the adjacent parallelogram portions so that half of the parallelogram, namely, a triangular shape, covers half of the adjacent parallelogram on one side and the other half is covered by half of the adjacent parallelogram on the other side.

One form of apparatus suitable for folding the reinforcement of the invention includes a plurality of pivotable and translatable finger members positioned along each of the fold lines. As shown in FIG. 4, fingers 41, 42 and 43 and similar fingers (not shown) are disposed within the vee of each of the fold lines and mounted with the free end of each finger being positioned on one edge of the belt at the end of each fold line. For example, as previously described, point 2 of line 1-2 is moved by finger 41 from the lower edge of the strip to the upper edge thereof during the folding operation. Similarly, point 4 of line 3-4 is moved by finger 42 from the upper edge to the lower edge of the strip. In addition to a pivoting action, it can be seen from the diagram in FIG. 6 that points move inwardly, e.g., point 1 to point 1' as the strip is folded. Thus, the fingers not only are pivotable members but also each finger is translatable so that a point on the outer circle shown in FIG. 6 moves to a point on the inner circle as the strip is folded from an initial open configuration to a folded position.

The folded belt as shown in FIG. 5 will, after removal of the folding fingers, e.g., 41, 42 and 43, return to a substantially cylindrical form for application to a tire carcass. The tread stock then may be applied over the carcass and belt and the assembly molded under heat and pressure to form the final tire. As pointed out above, the belt may be applied to a tire carcass either when the carcass is in flat band form or in the form of a torus.

It will be apparent from the above description that various modifications and variations in the procedures, methods and apparatus can be made within the scope of the invention. For example, the position of the cord in the initial endless strip prior to folding may be disposed differently than in a substantially cylindrical wrap. Also, the number of fold lines in a particular belt may vary over a wide range and will depend primarily upon the circumference and width of the initial endless strip and the desired final circumference and width of the folded reinforcement. In addition, the folding operation may be accomplished with different apparatus from the pivotable and translatable finger members illustrated.

The above description and drawings show that the present invention provides a novel folded endless reinforcement for a pneumatic tire which overcomes the disadvantages of bias cut fabric reinforcements and the problems of other spliced or lapped reinforcements heretofore know. The invention also provides a reinforcement with a high degree of uniformity so as to minimize the possibility of imbalance in the tire. Furthermore, the folded endless reinforcement of the invention is useful both for new belted tires and for retread belted tires. For new tires, the reinforcement of the invention is useful in radial ply tires where the reinforcement is applied after a carcass is shaped in the form of a torus. Also, the belt is suitable for tires made by flat band building methods in which the reinforcement is applied to a carcass in flat band form and expanded during the carcass shaping procedure. A further advantage of the reinforcement of the invention is the high degree of uniformity and symmetry which can be achieved in tires incorporating the reinforcement.

It is clear that the foregoing description and drawings are intended to illustrate preferred embodiments of the invention. Therefore, the scope of the invention is to be limited only by the following claims.

I claim:

1. An endless reinforcement for a pneumatic tire which comprises continuous cord in an endless folded strip, the cord being disposed across the width thereof from one side to the other in a generally zigzag pattern at an angle to the edges with reversals at the edges.

2. An endless reinforcement according to claim 1 wherein the continuous cord is covered with rubber.

3. An endless reinforcement according to claim 1 wherein the strip contains more than one cord.

4. An endless reinforcement according to claim 1 wherein the cord is associated with a rubber layer.

5. An endless reinforcement according to claim 1 wherein rubber shoulder portions are disposed intermediate the edges and adjacent the edge portions thereof.

6. An endless reinforcement according to claim 1 wherein the strip in its folded position is disposed in alternate portions on the outside surface and the inside surface of the reinforcement.

7. A method of producing an endless reinforcement for a pneumatic tire which comprises forming an endless strip of continuous cord and folding said strip to dispose the cord across the width thereof from one side to the other in a generally zigzag pattern at an angle to the edges with reversals at the edges.

8. A process according to claim 7 wherein said cord is covered with rubber.

9. A process according to claim 7 wherein said endless strip is formed by winding continuous cord in a cylindrical configuration with adjacent cord substantially parallel.

10. A process according to claim 7 wherein said endless strip is folded into a plurality of parallelogram portions so half of each parallelogram covers half of the adjacent parallelogram on one side and the other half is covered by half of the adjacent parallelogram on the other side.

11. A process according to claim 7 wherein said endless strip is folded by moving points on a first edge of the strip to the opposite edge thereof and points on the opposite edge of the strip to the first edge thereof in an alternate pattern.